United States Patent
Choi

(10) Patent No.: US 7,489,924 B2
(45) Date of Patent: Feb. 10, 2009

(54) APPARATUS AND SYSTEM FOR PROVIDING REMOTE CONTROL SERVICE THROUGH COMMUNICATION NETWORK, AND METHOD THEREOF

(75) Inventor: Moon-jeong Choi, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 758 days.

(21) Appl. No.: 10/377,756

(22) Filed: Mar. 4, 2003

(65) Prior Publication Data

US 2003/0171113 A1 Sep. 11, 2003

(30) Foreign Application Priority Data

Mar. 8, 2002 (KR) .......................... 2002-0012587

(51) Int. Cl.
H04M 3/42 (2006.01)
H04M 11/00 (2006.01)
H04L 12/403 (2006.01)

(52) U.S. Cl. ....................... 455/420; 370/346; 370/449; 379/102.01; 379/102.02; 379/102.07

(58) Field of Classification Search ........................ 379/102.01–102.07; 455/418–420; 370/346, 370/449
See application file for complete search history.

(56) References Cited

U.S. PATENT DOCUMENTS

| | | | | |
|---|---|---|---|---|
| 5,915,026 | A * | 6/1999 | Mankovitz | 713/168 |
| 6,256,378 | B1 * | 7/2001 | Iggulden et al. | 379/102.03 |
| 6,564,056 | B1 * | 5/2003 | Fitzgerald | 455/435.1 |
| 6,681,100 | B1 * | 1/2004 | Ge | 455/78 |
| 6,826,267 | B2 * | 11/2004 | Daum et al. | 379/102.03 |
| 6,965,935 | B2 * | 11/2005 | Diong | 709/224 |
| 6,970,539 | B2 * | 11/2005 | Yamamoto et al. | 379/102.05 |
| 7,072,945 | B1 * | 7/2006 | Nieminen et al. | 709/217 |
| 2002/0103898 | A1 * | 8/2002 | Moyer et al. | 709/224 |
| 2002/0112047 | A1 * | 8/2002 | Kushwaha et al. | 709/223 |
| 2002/0131569 | A1 * | 9/2002 | Ito et al. | 379/102.03 |
| 2003/0009597 | A1 * | 1/2003 | Joung | 709/249 |
| 2003/0038730 | A1 * | 2/2003 | Imafuku et al. | 340/825.24 |
| 2003/0105854 | A1 * | 6/2003 | Thorsteinsson et al. | 709/223 |
| 2004/0160319 | A1 * | 8/2004 | Joao | 340/539.1 |
| 2005/0046584 | A1 * | 3/2005 | Breed | 340/825.72 |

FOREIGN PATENT DOCUMENTS

JP 11-187061 A 7/1999

* cited by examiner

Primary Examiner—Harry S Hong
(74) Attorney, Agent, or Firm—Sughrue Mion, PLLC

(57) ABSTRACT

An apparatus, system and method for providing remote control service to devices in a home network are disclosed. A web page provider provides a master page of the home network, information on the devices in the home network, and a list of remote control service to remote and in-house users in a web page form. An identifier identifies the remote users. A message processor processes message inputs and outputs related to service registration, service validness, etc. of the devices in the home network. A storage device stores device and service information on the devices in the home network. A main controller controls operations of each element. Accordingly, a remote control service limited to a specific household device becomes applicable to various devices. Not only remote control and management, but also program download, installation and upgrade necessary for the remote control is possible.

17 Claims, 6 Drawing Sheets

APPARATUS AND SYSTEM FOR PROVIDING REMOTE CONTROL SERVICE THROUGH COMMUNICATION NETWORK, AND METHOD THEREOF

BACKGROUND OF THE INVENTION

1. Field of the Invention

The present invention relates to an apparatus, system and method for providing a remote control service to devices in a home network, and more particularly, to an apparatus, system and method for providing a remote control service to remotely control and manage devices connected to a home network.

2. Description of the Related Art

In the related art, household appliances and devices are classified into information devices (including personal computers, faxes, scanners and printers, etc.), audio/video devices (including TV sets, set-top boxes, DVDs, VCRs, audio systems, camcorders and home game machines, etc.), control devices (including coffee makers, electric rice cookers, refrigerators, washing machines, microwave ovens and cameras), and dummy devices including remote controllers, interphones, sensors and lighting equipment. These household devices are connected to subnets including phone-lines, a wireless LAN, a Bluetooth network, a Universal Serial Bus (USB), an IEEE 1394 network and power-lines depending on its physical characteristics.

FIG. 1 shows a configuration of a typical related art home network. A phone 120a, a notebook computer 120b, a fax machine 120c and a computer 120d are connected to the phone-lines 120 to construct an independent network. A notebook computer 130a and Personal Digital Assistant (PDA) 130b are connected to the wireless LAN or Bluetooth network 130. A computer 140a, a printer 140b and a scanner 140c are connected to the USB and a TV 150a, a camcorder 150b and an audio system 150c, 150d are connected to the IEEE 1394 network as a protocol for audio/video system. Also, control devices including a coffee maker 160a, an electric rice cooker 160b, a refrigerator 160c and a washing machine 160d are connected to the power-lines 160. These subnets 120, 130, 140, 150, 160 form the home network, which is interconnected using a connecting device 170 like a bridge. A gateway 110 plays a role of a pathway interconnecting each device existing in the subnets and external networks.

However, the conventional networks including the phone-lines 120 and power-lines 160 and new networks including the Bluetooth network and the wireless LAN 130 co-exist in the household devices, and each device is operated by its own hardware and software platform, which may be different from each other. Subsequently, it is not easy to construct a home network in single system. Therefore, it is suggested as a home network construction method that a related art virtual computing environment referred to as middleware be implemented in each device dispersed over a house, and application programs be provided over the middleware.

In the related art, various services are provided for controlling household devices within and without the house. Remote control to the household devices is performed by direct access to those equipped with a network connecting device via a gateway of the home network.

However, the related art has various problems and disadvantages. For example, but not by way of limitation, the related art method has at least the drawback of accommodating devices only equipped with the related art network-connecting device.

In addition, the related art middleware only controls the same kind of devices having specific similar characteristics using an independent mechanism. Accordingly, it is not possible to control household devices having substantially diverse characteristics. Thus, related art middleware alone cannot provide remote control and management services to overall household devices.

SUMMARY OF THE INVENTION

Accordingly, it is an objective of the present invention to provide an apparatus and system for providing integrated remote control service to household devices having diverse characteristics, and method thereof.

To achieve the object, according to one aspect of the present invention, there is provided an apparatus for providing remote control service through a communication network comprising a web page provider for providing information on a household device having remote control/management services available in a web page form, a message processor that receives a registration request message from the household device and outputs a polling message to check whether the household device is active and a storage device that stores device and service information of the household device.

The web page provider further comprises an identifier that identifies the user.

In another aspect of the present invention, there is provided a remote control system for providing remote control service through a communication network in a household device coupled to a home network, comprising: an external server coupled to the communication network, said external server providing coupling means to a user so that the user can be coupled to the household device, and a master server that has device and remote control service information of the household device and provides the device and remote control service information to the external server in a web page form.

The master server includes a message processor that receives a registration request message from the household device and outputs a polling message to check whether the household device is active; a web page provider that provides information of the household devices having remote control/management services available in a web page form; and a storage device that stores device and service information of the household device. The web page provider has an identifier that identifies the user. Also, the master server downloads a program to provide the remote control service from the external server, and provides the program to the household device.

In yet another aspect of the present invention, there is provided a method for providing a remote control service through a communication network comprising: (a) providing home network information in a web page form; (b) inputting characteristic information on a household device to be controlled/managed remotely from a user; (c) providing the information of the household device corresponding to the characteristic information in the web page form; (d) selecting the household device to be controlled/managed remotely, from the user; (e) providing an item of remote control/management service on the household device selected by the user in the web page form; and (f) providing the remote/management service corresponding to the item of the remote control/management service selected by the user.

Here, before step (a), device and service information of the household device based on a registration request message received from the household device are stored.

The characteristic information is category information including at least one of a type and a manufacturer of the household device. The information of the household device comprises basic information including at least one of the kind, the manufacturer and a location of the device and information on a list of respective ones of the household device providing the remote control/management service. The item of the remote control/management information comprises at least one of fault management, charge management, performance management and security management.

According to the present invention, a remote control service limited to a specific household device becomes applicable to various devices. So, it is available the remote control and management, and also program download, installation and upgrade necessary for the remote control.

BRIEF DESCRIPTION OF THE DRAWINGS

The above-described objectives and features of the present invention can be clarified by describing preferred embodiments in detail with the accompanying drawings.

DETAILED DESCRIPTION OF THE PREFERRED EMBODIMENT

Figure 1:
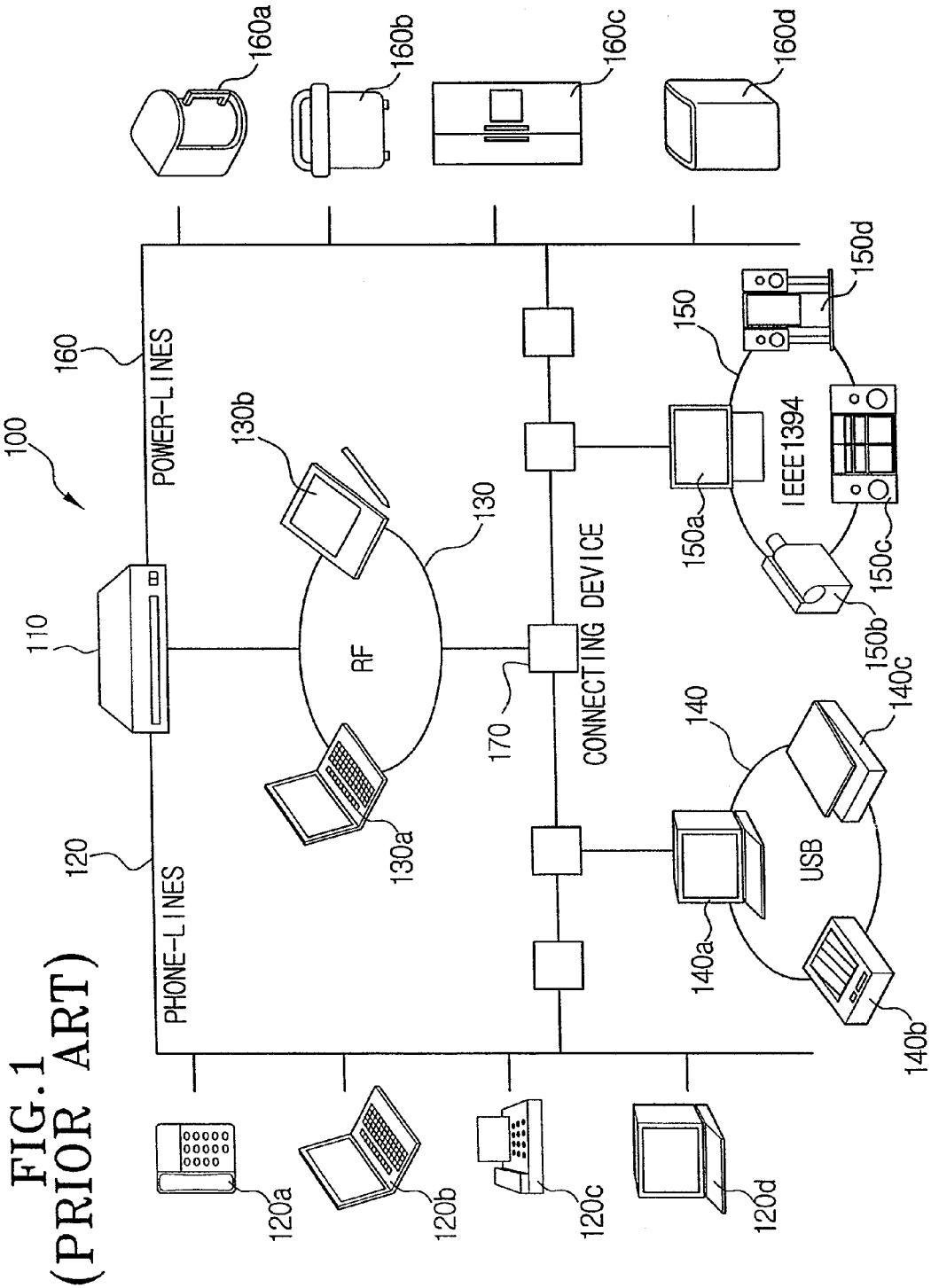
FIG. 1 shows a configuration of a typical related art home network.

Preferred embodiments of the present invention will now be described with reference to the accompanying drawings. The same reference numerals of each drawing indicate the same element.

Figure 2:
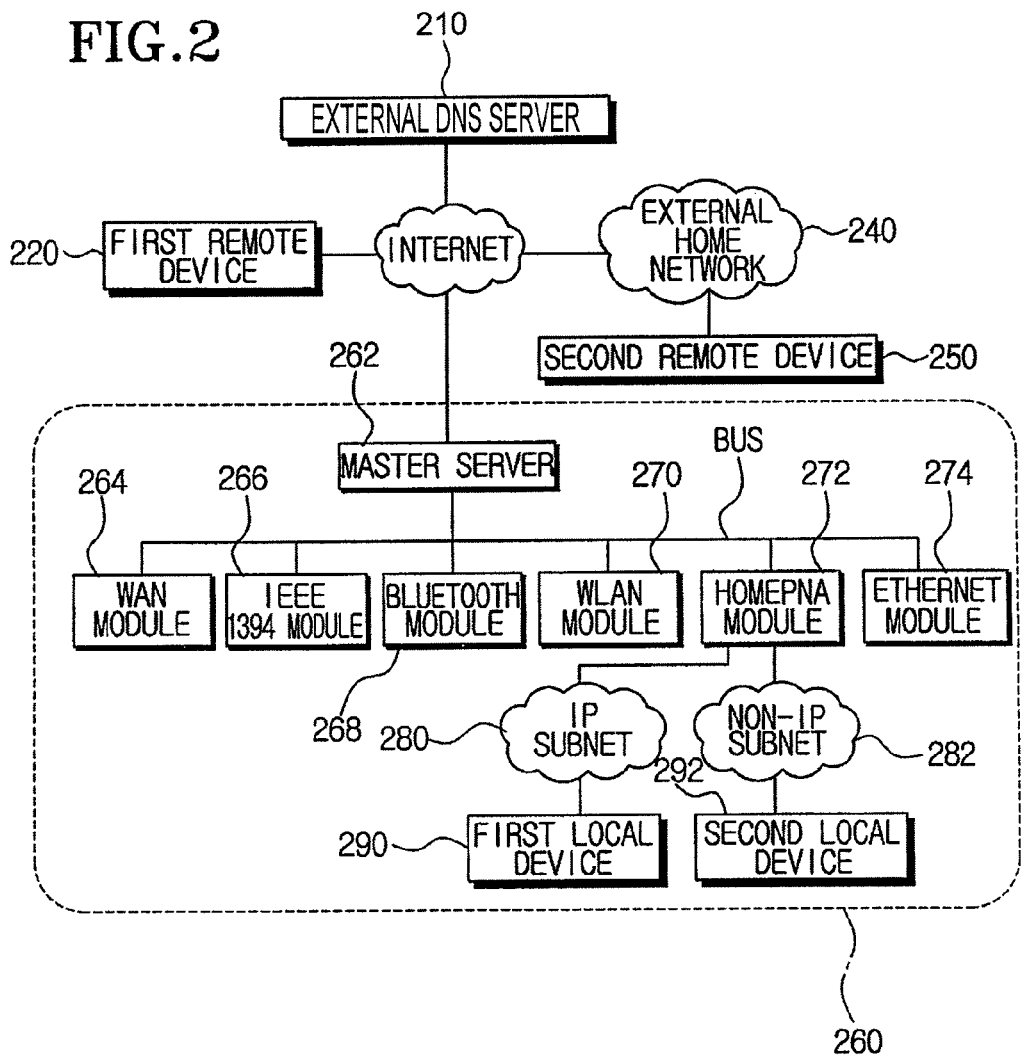
FIG. 2 shows a configuration of a home network equipped with a device for providing a remote control service according to a non-limiting, exemplary embodiment of the present invention.

FIG. 2 shows a configuration of a home network equipped with device for providing a remote control service according to the present invention. The overall network includes an external network, and a home network 260. The external network includes an external Domain Name Server (DNS) server 210, a first remote device 220 and an external home network 240. The external home network 240 is coupled to a second remote device 250.

The external DNS server 210 gets registrations of a Uniform Resource Locator (URL) of the home network 260 and an authorized Internet Protocol (IP) address allocated to the home network 260 from a master server 262 of the home network 260 and stores them. Optionally, it is possible to connect to the home network 260 from the outside.

The home network 260 includes the master server 262, a Wide Area Network (WAN) module 264, an IEEE 1394 module 266, a Bluetooth module 288, a wireless Local Area Network (wLAN) module 270, a Home Phoneline Network Alliance (PNA) module 272 and an Ethernet module 274. Each module 264 through 274 is coupled to the master server 262 via buses.

The WAN module 264, the IEEE 1394 module 266, the Bluetooth module 268, the wLAN module 270, the Home-PNA module 272 and the Ethernet module 274 each have means for receiving data from, and transmitting data to, devices communicating via respective protocols. Since the communication process between these modules and devices is obvious to those skilled in the art, detailed descriptions will be abbreviated.

The HomePNA module 272 has an IP subnet 280 and a non-IP subnet 282. The IP subnet 280 includes intelligent devices (for example, but not by way of limitation, a first local device 290) and the non-IP subnet 282 includes non-intelligent devices (for example, but not by way of limitation, a second local device 292) such as dummy devices. The dummy devices including lighting equipment, a door or a washing machine have no self-control ability, but are operated as specified.

The basic protocol of the home network is Transmission Control Protocol/Internet Protocol (TCP/IP). Under the circumstance of a plurality of nodes connected with each other in the home network, a specific node is identified with an IP address.

The master server 262 is a leading node that makes the home network 260 communicate with the other home network 240 and an external network such as the Internet 230. Accordingly, in the master server 262, there exists transform between private IP addresses allocated to home network devices and authorized IP addresses used in the external network like the Internet 230.

The master server 262 processes data transmitted from or to each module and provides device information through the networks. To achieve this, the master server 262 manages information on devices existing in the home network and provides information on registered devices in response to the information request. The master server 262 also manages the private IP addresses allocated to devices in the home network 260. Therefore, all of nodes in the home network can exchange information with each other without regarding (i.e., independent of) network media interface.

Further, the master server 262 makes communication between the home network 260 and the outside possible by registering the URL of the home network 260 and an authorized IP address allocated currently to the home network to the external DNS server 210. Although the master server 262 is disclosed as performing the function of a gateway in the drawings and description, the gateway may be comprised as an individual device apart from the master server 262.

The master server 262 includes a DNS server (not shown) and Dynamic Host Configuration Protocol (DHCP, not shown). The DNS server provides host names to devices in the home network 260. The host names of the devices in the home network 260 may be given by a user or adopted from default names made in advance to represent each functional meaning of the devices. In case the same default names exist, an extended number can be added. The host names are used when the devices request allocation of their private IP addresses to the DHCP. The DHCP allocates respective unique identifier (i.e., IP address) to respective devices in the home network 260.

A proxy server (not shown) transforms service in an application level to transfer the service of IP networking to a non-IP node. The proxy server allocates each device to each private IP address by the DHCP on behalf of the devices connected to the non-IP subnet 282 (named non-IP devices, hereafter) in order to connect the devices without being TCP/IP supported to the home network.

The proxy server also catches the status of the non-IP node. Namely, it manages the status information on whether the non-IP node is powered on, whether it is coupled to the home network. Furthermore, the proxy server manages the private IP addresses allocated on behalf of the non-IP devices, and manages information on the relationship between the private IP addresses of the non-IP devices and their hardware addresses. This proxy server may be apart from the master server 262. Alternatively, the master server 262 may perform the function of the proxy server.

The devices in the home network can be defined as service clients if they request connection to the other devices, and as service servers if they allow connection when requested by the other devices. The service server always opens an access point of its own to await a request from the service client, and allows connection when the service client requests it.

Each of the devices in the home network may become the service server or the service client according to the connection request or connection allowance. This results from a decision on whether each device acts as the service server or the service client according to a state of operation. Namely, when a device connects to the DHCP to request a private IP address allocation, the device becomes the service client and the DHCP becomes the service server. Alternatively, the device becomes the service server when it provides the service to the other device according to a request from the other device.

There are two kinds of interfaces between the service server and the service client, direct interface and indirect interface. In the direct interface, the service server and the service client transmit and receive data units to and from each other directly through IP networking path. In the indirect interface, the service server and the service client transmit and receive data units to and from each other through the proxy server, when the service server is the non-IP node.

Figure 3:
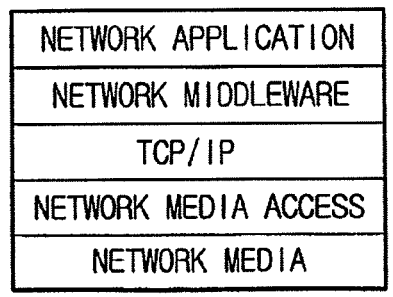
FIG. 3 shows a protocol stack of a home network using middleware according to a non-limiting, exemplary embodiment of the present invention.

FIG. 3 shows a protocol stack of the home network using middleware. The middleware is software that communicates between devices belonging to different categories, and makes communication between various devices in the home network possible. The middleware poses between the operating system and application programs. Under the client-server circumstance, the middleware couples distributed application programs with distributed data transparently. In addition, the middleware couples diverse protocols, system structure, the operating system, a database and the application programs to the hardware independently in order to support them.

This middleware adopts the TCP/IP as a backbone protocol and interacts with the other protocol stack such as User Diagram Protocol (UDP) using separate transformation devices.

Figure 4:
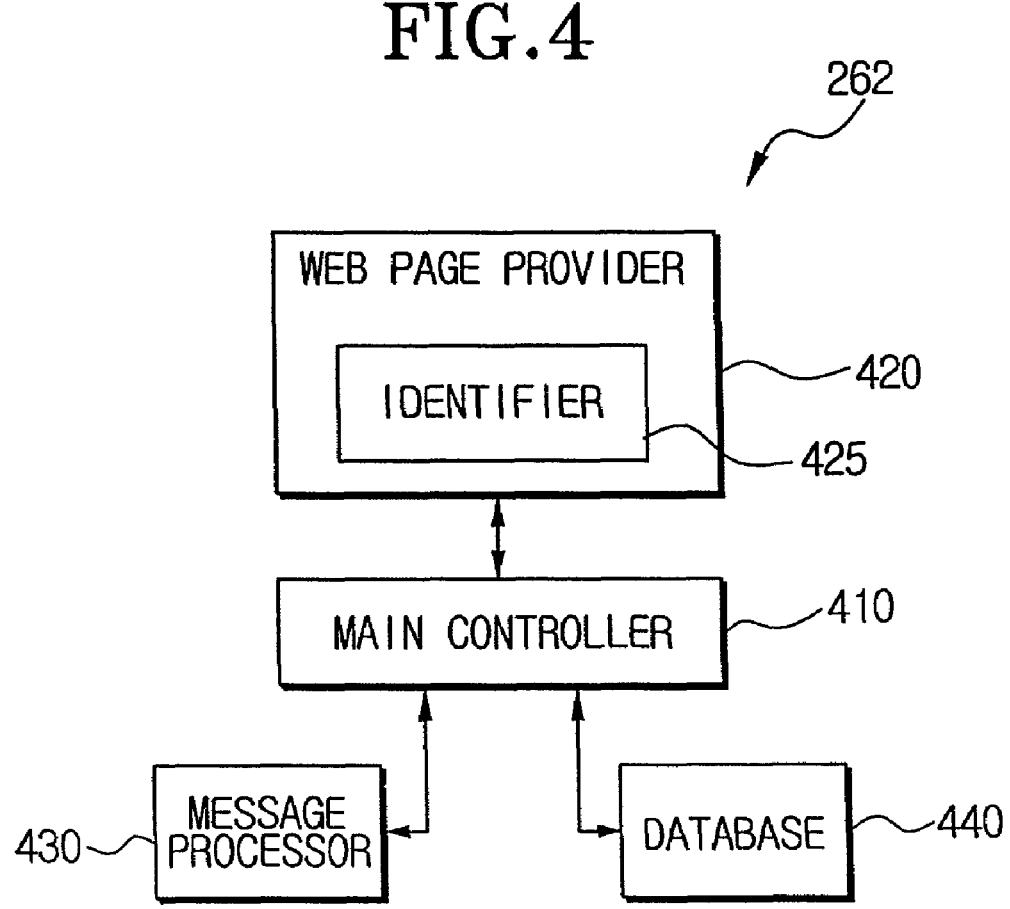
FIG. 4 is a block diagram of an apparatus for providing a remote control service according a non-limiting, exemplary embodiment of the present invention.

FIG. 4 is a block diagram of configuration of an apparatus for providing remote service according to the present invention. Although the master server 262 acts as the apparatus for providing the remote service in the present exemplary embodiment, the apparatus may be alternatively comprised apart from the master server 262. The master server 262 includes a main controller 410, a web page provider 420, a message processor 430 and a database 440.

The web page provider 420 provides information on the home network and the devices in the home network to users at remote sites and in the house in a web page form. The users at remote sites are coupled to the master server 262 via user-to-device interface provided by the web page provider 420 to control and manage each device. The web page provider 420 includes an identifier 425 that identifies remote users.

The message processor 430 processes a control middleware protocol. The message processor 430 also processes message inputs and outputs related to service registration of devices in the home network, management of service validity, responses to questions on service and service requests on devices, etc., via device-to-device interface.

In the database 440, service information on the devices in the home network is stored. The main controller 410 controls operations of each element and retrieves the corresponding information from the database 430 to provide a response to service information requests from the web page provider 420 and the message processor 430.

Figure 5:
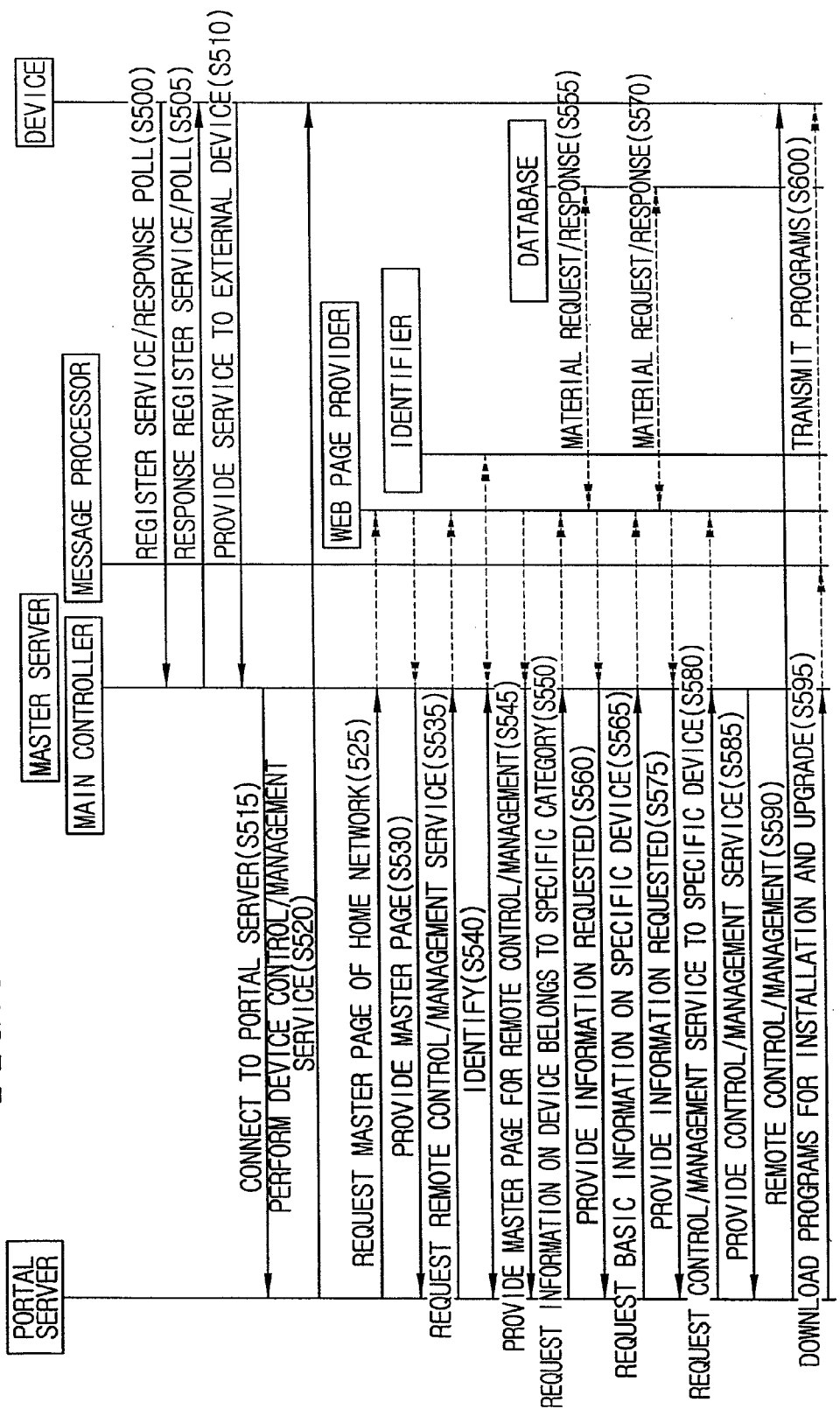
FIG. 5 shows data flow between an external server and each element of the apparatus for providing a remote control service according to a non-limiting, exemplary embodiment of the present invention.

FIG. 5 shows data flow between each element of the master server and the external server. When the household devices are powered, they request registration of information on services they can provide (step S500). Device and service information of the household devices is stored in the database 440, and the master server 262 provides the registration results to the household devices (step S505). Meanwhile, if information of the household devices is already registered, the steps S500 and S510 are replaced into steps of outputting surveillance signals by the master server 262 and responding to them by the household devices. In this case, when the master server 262 outputs the surveillance signals to the household devices (step S505), any household device that is powered on outputs a response signal (step S500). In these steps, the household devices re-register the changed portions of their device and service information to the master server 262 to update them in the database 440. The household devices whose registrations are completed become controlled and managed remotely from the inside and outside of the house.

When the household devices request connections to an external server (for example, but not by way of limitation, a portal server providing function of control and management to the household devices) (step S510), the main controller 410 connects them to the corresponding external server using its authorized IP address (step S515). The portal server connects itself directly to the household devices to control/manage them (step S520).

When a request of transmitting a master page of the home network is received from the portal server (step S525), the web page provider 420 transmits the master page in a web page form to the portal server (step S530). Home network information provided by the web page provider 420 includes (but is not limited to) menus of control/management and status information display to the household devices, etc.

Figure 6:
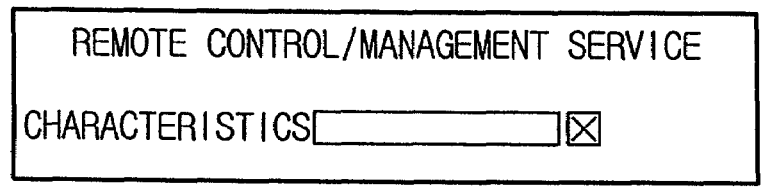
FIG. 6 shows an example of a web page for remote control and management, transmitted from a web page providing portion to a portal server according to a non-limiting, exemplary embodiment of the present invention.

When requests on control/management service are received from the portal server (step S535), the identifier 425 outputs an identification display for accepting inputs of a user identification information and password from the remote user (step S540). After the remote user is identified as authorized for the remote control service in the identifier 425, the web page provider 420 transmits the web page for remote control/management to the portal server (step S545). For user identification, the identifier 425 includes storage (not shown) for storing information on authorized users and a registration portion (not shown) for granting authorities to non-registration users. An example of the web page for remote control/management transmitted from the identifier 425 to the portal server is shown in FIG. 6.

The portal server requests information from the web page provider 420 by transmitting device characteristics (for example, but not by way of limitation, a manufacturer, a kind of the device, etc.) input from the remote user (step S550). For example, if the remote user inputs "Samsung Electronics", it is considered as an information request on a household device whose manufacturer is Samsung. The web page provider 210 acquires information on the corresponding device by retrieving it from the database 440 according to the characteristics input from the remote user (step S555). The web page provider 420 provides the acquired information in a web page form to the portal server (step S560).

Figure 7:
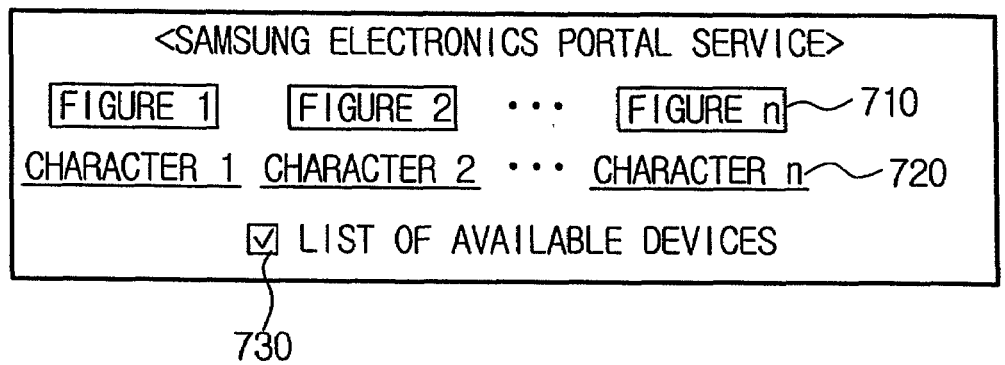
FIG. 7 shows an example of a web page provided to the portal server at step S560 according to a non-limiting, exemplary embodiment of the present invention.

FIG. 7 shows an example of the web page provided to the portal server in the step S560. The web page provided to the portal server includes an image or icon 710 of a household device whose manufacturer is Samsung, a selection field of information display on each household device 720, a selection field of household device list providing the remote control service 730, etc. When the remote user clicks on the selection field of household device list 730, there is provided a list of household devices having remote control/management currently available using remote control service.

To the web page provider 420, the portal server requests information on a specific device selected by the remote user (step S565). When the web page provider 420 receives the requests of basic information (e.g., a kind, title and status of the device) or of undertaking the control/management function on the corresponding device from the remote user, the web page provider 420 retrieves the corresponding information from the database 440 (step S570 or S580). The basic and service list information of the household devices is included in a registration request message. The household devices request registration to the master server 262 using the registration request message. The household device information included in the registration request message is written in the database 440. Through the above-described steps, the remote user can inspect the information of the household devices remotely and utilize the remote control service (step S590).

The master server 262 does not only provide control/management service of the household devices to the remote users, but downloads application or upgrade programs necessary to them from the portal server (step S595). The message processor 430 transforms the downloaded programs into a request control message and transmits it to the corresponding devices (step S600).

Meanwhile, it is possible to provide the control/management service between the devices in the home network. The web page provider 420 also provides this service. Since detailed service providing steps are the same as the above-described remote control service, detailed description is abbreviated.

Figure 8:
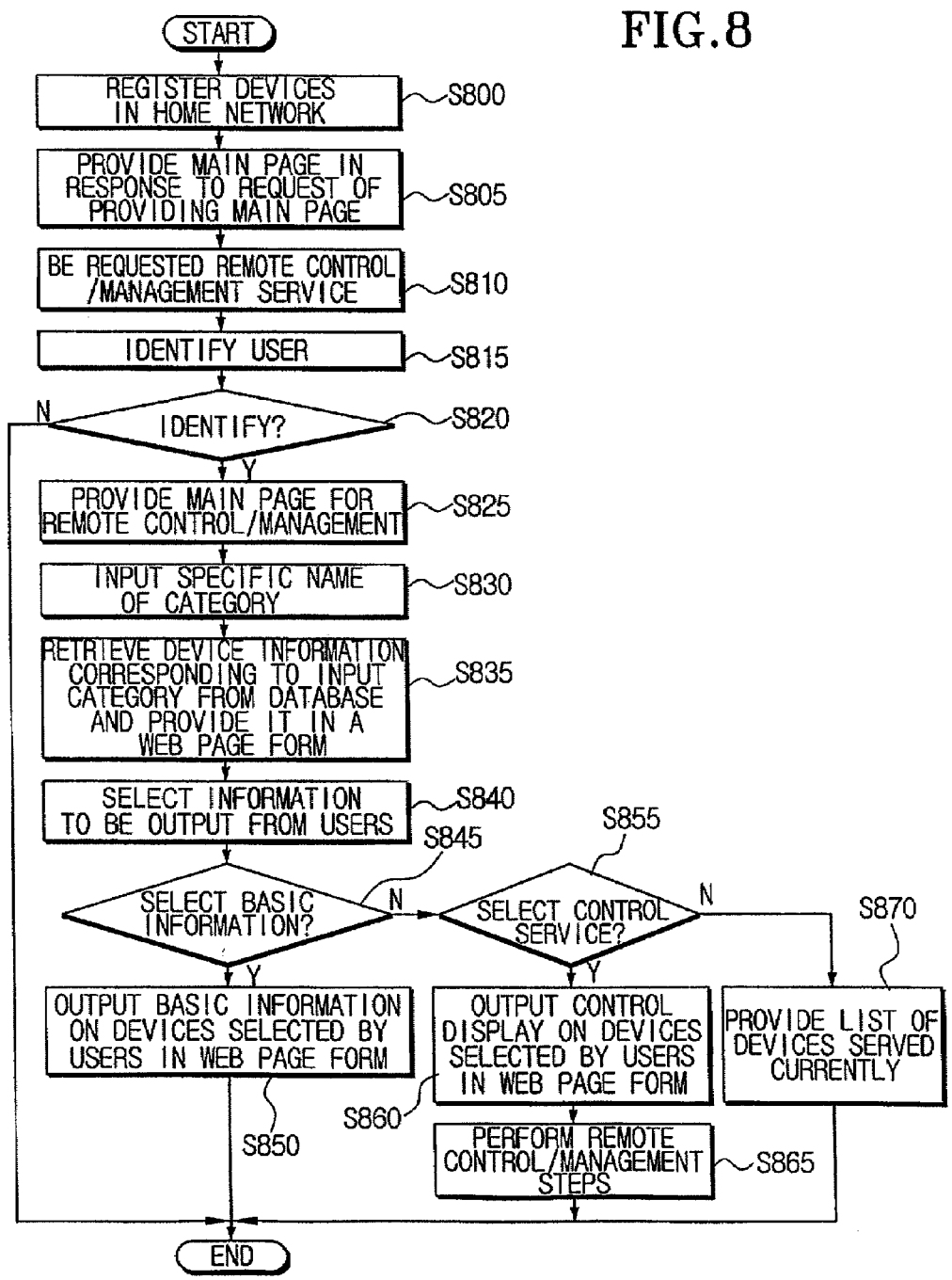
FIG. 8 is a flow chart for control and management process by remote users to household devices according to a non-limiting, exemplary embodiment of the present invention.

FIG. 8 is a flow chart of control and management processes performed by a remote user of the household devices. The household devices register their device and service information when powered on (step S800). The device and service information of the household devices is stored in the database 440.

The master server 262 responds to requests of information on the home network by the remote user connected via the portal server, and provides the information in a web page form to the remote user (step S805).

The remote user inspects the information received in the web page form and selects a control/management menu to request a control/management service to the household devices (step S810). The identifier 425 identifies the remote user (step S815). When the identifier 425 confirms the remote user as authorized (step S820), the web page provider 420 transmits a web page for remote control/management to the portal server (step S825).

The remote user inputs device characteristics (for example, but not by way of limitation, a manufacturer, a kind of the device, etc.) in the input field on the web page displayed on his terminal (step S830). The web page provider 420 retrieves information corresponding to the devices input by the remote user from the database 440 and provides the retrieved information to the portal server in the web page form (step S835). The web page provided to the portal server includes an image or icon 710 of a device corresponding to the characteristics input by the remote user, an information display menu 720 to each household device, and a menu of list of the household devices providing the remote control service 730, etc.

The remote user selects information to be output among selection menus on the web page (step S840). If the remote user selects the information display menu 720 (step S845), the basic information (for example, but not by way of limitation, a kind of the device, a manufacturer, a location of the device, etc.) on the corresponding device is provided (step S850). Alternatively, when the remote user selects the image or icon 710 of a specific device (step 855), the web page provider 420 provides display for the control/management to the corresponding device in the web page form (step S860). The remote user controls and manages his household devices on his terminal (step S865). If the remote user selects the menu of list of the household devices 730, the web page provider 420 provides a list of household devices whose the remote control service is available (step S870).

Remote control/management service that the remote user can utilize includes (but is not limited to) fault management (fault-finding, fault-isolation, fault-correction, etc.), charge management (charge information collection, etc.), configuration management (network configuration change, parameter change, check on status of operation, etc.), performance management (performance improvement, fault rate management, statistics collection, history management, etc.) and security management, etc.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for providing remote control service through a communication network, comprising:

a web page provider that provides information on a household device having remote control/management services available in a web page form;

a message processor that receives a registration request message from the household device and outputs a polling message to determine whether the household device is active, a storage device that stores device and service information of the household device; and a proxy server which transfers a service of Internet Protocol (IP) networking to a non-IP node and manages private IP addresses of non-IP devices, wherein the web page provider transmit a web page for the remote control service after a remote user is identified for the remote control service.

2. The apparatus according to claim 1, wherein the web page provider further comprises an identifier that identifies a user.

3. A remote control system for providing remote control service through a communication network in a household device coupled to a home network, comprising:
- an external server coupled to the communication network, said external server providing coupling means to a user so that the user can be coupled to the household device; and
- a master server that has device and remote control service information of the household device and provides the device and remote control service information to the external server in a web page form, wherein the master server comprises:
  - a message processor that receives a registration request message from the household device and outputs a polling message to check whether the household device is active;
  - a web page provider that provides information of the household devices having remote control/management services available in a web page form;
  - a storage device that stores device and service information of the household device; and
  - a proxy server which transfer a service of Internet Protocol (IP) networking to a non-IP node and manages private IP addresses of non-IP devices, wherein the web page provider transmits a web page for the remote control service after a remote user is identified as authorized for the remote control service.

4. The system according to claim 3, wherein the web page provider has an identifier that identifies the user.

5. The system according to claim 3, wherein the master server downloads a program to provide the remote control service from the external server, and provides the program to the household device.

6. A method for providing a remote control service through a communication network comprising:
- (a) providing home network information in a web page form;
- (b) inputting characteristic information on a household device to be at least one of controlled remotely and managed remotely from a user;
- (c) providing the information of the household device corresponding to the characteristic information in the web page form;
- (d) selecting the household device to be at least one of controlled remotely and managed remotely, from the user;
- (e) providing an item of at least one of remote control and remote management service on the household device selected by the user in the web page form;
- (f) providing the at least one of remote control and remote management service selected by the user; and
- a proxy server which transfer a service of Internet Protocol (IP) networking to a non-IP node and manages private IP addresses of non-IP devices, wherein the web page information is provided in a web page after a remote user is identified as authorized for the remote control service.

7. The method according to claim 6, further comprising the step of storing device and service information of the household device based on a registration request message received from the household device before step (a).

8. The method according to claim 6, wherein the characteristic information is category information including at least one of a type and a manufacturer of the household device.

9. The method according to claim 6, wherein the information of the household device comprises basic information including at least one of the kind, the manufacturer and a location of the device and information on a list of respective ones of the household device providing the remote control and remote management service.

10. The method according to claim 6, wherein the item of the at least one of remote control service and remote management information comprises at least one of fault management, charge management, performance management and security management.

11. The system of claim 3, wherein said control service comprises at least one of fault management, charge management, performance management and security management.

12. The system of claim 3, wherein said master server is coupled to at least one of a wide area network (WAN) module, an IEEE 1394 module, a Bluetooth module, an home PNA module, and wide LAN module and an Ethernet module.

13. The system of claim 12, wherein said home PNA module is coupled to an Internet protocol (IP) subnet and a non-IP subnet.

14. The system of claim 13, wherein said IP subnet is coupled to a first device and said non-IP network is coupled to a second device.

15. The method of claim 6, wherein said communication network is coupled to at least one of a wide area network (WAN) module, an IEEE 1394 module, a Bluetooth module, an home PNA module, and wide LAN module and an Ethernet module.

16. The method of claim 15, wherein said home PNA module is coupled to an Internet protocol (IP) subnet and a non-IP subnet.

17. The method of claim 16, wherein said IP subnet is coupled to a first device and said non-IP network is coupled to a second device.

* * * * *